Patented Jan. 16, 1923.

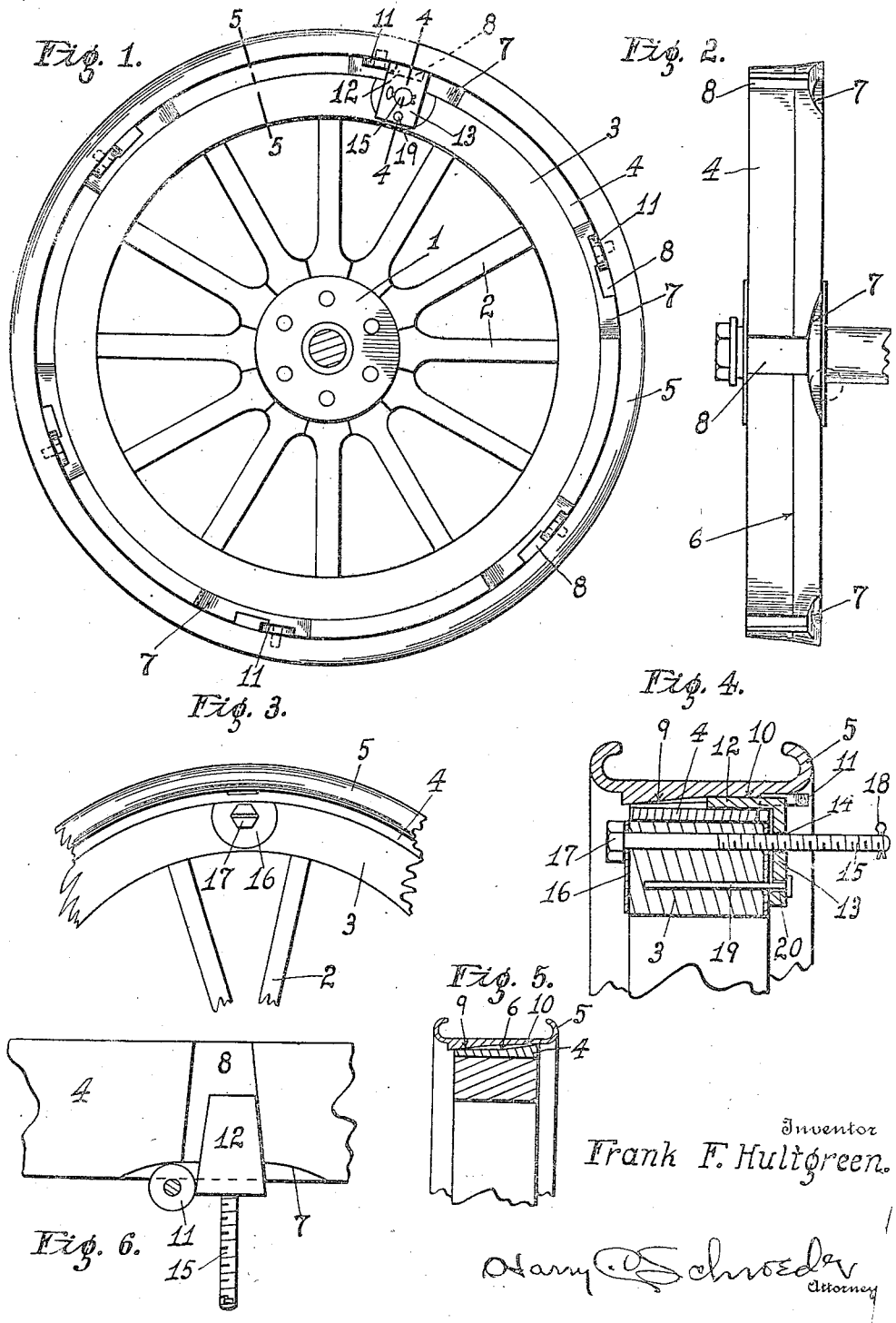

1,442,409

UNITED STATES PATENT OFFICE.

FRANK F. HULTGREEN, OF SANTA ROSA, CALIFORNIA, ASSIGNOR OF ONE-THIRD TO FRED PETERSEN, OF SANTA ROSA, CALIFORNIA.

DEMOUNTABLE VEHICLE WHEEL RIM.

Application filed August 31, 1920. Serial No. 407,119.

*To all whom it may concern:*

Be it known that I, FRANK F. HULTGREEN, a citizen of the United States, residing at Santa Rosa, in the county of Sonoma and State of California, have invented certain new and useful Improvements in Demountable Vehicle Wheel Rims, of which the following is a specification.

My invention is an improved demountable vehicle wheel rim.

Referring to the annexed drawing in which my invention is illustrated, and which forms a part of this specification:

Figure 1 is an inside view of a vehicle wheel embodying my invention.

Figure 2 is an edge view of said wheel.

Figure 3 is a fragmentary outside view of said wheel.

Figure 4 is a cross section of the wheel taken on line 4—4 of Fig. 1.

Figure 5 is a cross section of the wheel taken on line 5—5 of Fig. 1.

Figure 6 is a fragmentary peripheral view of the felly band showing the engagement of the wedge and one of the rim rollers to hold the rim against creeping.

In the drawing, 1 indicates the hub; 2 the spokes; 3 the felly; 4 the felly band surrounding the felly; and 5 the rim of the vehicle wheel. The periphery of the felly band 4 inclines slightly upwardly from its outer edge to a circumferential line 6 and from said line at a greater angle to the inner edge of the band. The inner edge of the band is formed with a plurality of concaves 7, preferably six in number, spaced at equal distances apart. Grooves 8 are provided in the periphery of the felly band 4 which extend transversely of the band from the outer edge thereof to the center of the concaves 7 respectively. The rim 5 has a slightly inclined inner surface 9 which inclines outwardly from about midway of the edges of the rim towards the outer edge of the rim, said surface being adapted to engage the outer edge of the periphery of the felly band 4, and the inner straight surface 10 of the rim which extends from said inclined surface 9 to the inner edge of the rim being adapted to engage the inner edge of the felly band. A plurality of rollers 11 corresponding in number to the number of grooves 8 and concaves 7 and spaced equal distances apart are journaled on the periphery of the rim at the inner edge thereof. A wedge 12 formed with a right angular member 13 is adapted to extend into one of the grooves 8 between one edge of the groove and one of the rollers 11. The wedge member 13 is provided with a threaded aperture 14 which is engaged by a bolt 15 which extends transversely through the felly 3 and through a washer 16 on the outside of the felly, the head 17 of the bolt being on the outer end of the bolt and engaging said washer. A cotter pin 18 extends through the inner end of the bolt 15. A pin 19 extends through an aperture 20 in the wedge member 13 and slides into the inner side of the felly 3, said pin preventing the wedge 12 from turning with the bolt 15 when said bolt is turned.

Before the rim is placed on the felly band the bolt 15 is turned until the wedge member 13 is screwed to the inner end of the bolt and the wedge 12 withdrawn inwardly from the groove 8, the pin 19 sliding through the aperture 20. The rim is then slipped over the felly band 4 from the outside of the wheel, the rollers 11 passing through the grooves 8 into the concaves 7. The rim is then turned on the felly band until the rollers 11 engage the wall of the concaves 7 at one side of the grooves 8. The bolt 15 is then turned until the wedge 12 is screwed into the groove 8 tightly between one edge of the groove and the adjacent roller 11, whereby the rollers 11 are caused to ride inwardly on the concaves 7 and draw the inner inclined surface 9 of the rim 5 tightly against the outer edge of the felly band and thus firmly hold the rim on the felly band against displacement, both laterally and circumferentially.

To remove the rim from the felly band the bolt 15 is first turned until the wedge 12 is screwed to the inner end of the bolt and withdrawn from the groove 8 and roller 11. The rim is then turned on the felly band until the rollers 11 register with the forward end of the grooves 8. The rim is then withdrawn outwardly off the felly band, the rollers passing through the grooves.

Having described my invention, I claim:

In combination, a vehicle wheel provided with a laterally inclined rim supporting surface, a demountable rim adapted to seat thereon, a plurality of transversely extending grooves in the outer face of the wheel terminating in circumferentially extending cam surfaces at the inside thereof, an equal number of rollers mounted on radial axes at the laterally inner side of the rim, said rollers adapted to pass through the said grooves and by relative circumferential movement of the wheel and rim contact with the cam surfaces and draw the wheel and rim into wedging engagement and means to secure the parts in operative position.

In testimony whereof I affix my signature.

FRANK F. HULTGREEN.